ABSTRACT OF THE DISCLOSURE

A method for improving the quality of poultry eggs, especially the albumen height, which consists of orally administering to laying hens a diet which consists of a nutrient feed ration containing an androgen. The androgen is present in the nutrient feed ration in the proportion of about 0.1 to 20 milligrams for each pound of ration.

---

This invention relates to egg quality in poultry and more particularly to novel feeding materials and methods which have been found to have a striking effect in improving and maintaining egg quality.

Egg quality is of major concern to the poultry industry. Serveral methods have been used to determine egg quality but the most accurate indication of overall quality is furnished by albumen height. The albumen in a fresh egg should have a thick gelatinous consistency and stand up around the yolk when the egg is broken out.

It has been found in accordance with the present invention that egg quality as manifested by albumen height is substantially improved by orally administering conventional poultry feed compositions containing androgenic compounds to laying hens.

The poultry diet of the present invention incorporates from about 0.1 to 20 milligrams of an androgen such as testosterone and androsterone per pound of diet. In general the androgenic compounds other than testosterone and androsterone that provide the results of this invention are similar in chemical structure to testosterone and androsterone, which compounds are represented by the following formulae:

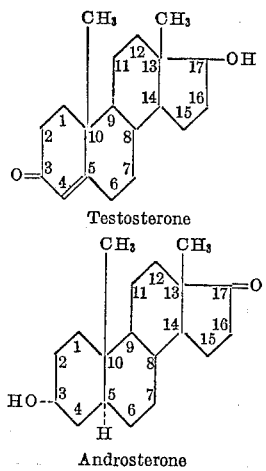

Testosterone

Androsterone

The androgenic compounds useful in this invention are cyclopentenophenanthrene derivatives having 17 nuclear carbon atoms, a substituent methyl group at position 10, a substituent methyl group at position 13 and a substituent at both positions 3 and 17 selected from the group consisting of a keto-oxygen substituent and a hydroxyl substituent. The substituents at positions 3 and 17 may be the same or different and when the compound has a double bond it may be between either the 4–5 position or the 5–6 position.

Androgens useful in accordance with the present invention include by way of example and not limitation:

Testosterone

Methyltestosterone
5-α-androstan-17β-ol-3-one 17-(1'-ethoxy)-cyclopentyl ether
Testosteron 17-(1'-ethoxy) cyclopentyl ether
Testosterone 17-(Δ''-cyclopentyl)ether
Testosterone 17-(1'-ethoxy)cyclohexyl ether
$\Delta^4$-androstene-3β,17β-diol 17-(1'-ethoxy) cyclopentyl ether
19-nortestosterone 17-(Δ'-cyclopentenyl) ether
4-hydroxy-17α-methyltestosterone
4-hydroxy-17α-methyl-19-nortestosterone Androsterone 19-nortestosterone
$\Delta^4$-androstene-3,17,dione
11α-hydroxy-androst-4-ene-3,17,dione
$\Delta^4$-androstene-3β,17β-diol
$\Delta^4$-androstene-3α,17β-diol
3-androstanone
$\Delta'$-17α-methyltestosterone
9α-fluoro-11β-hydroxy-17α-methyltestosterone
17β-hydroxy-17α-methyl androstano-(3,2-c)-pyrazole
(±)13β,17α-diethyl-17β-hydroxygon-4-en-3-one Mixtures of the above androgenic compounds may be used if desired.

The androgenic compounds can be incorporated in any or all components of the diet in such quantities that the overall intake by the fowl of androgenic compound is at the rate of 0.1 to 20 milligrams per pound of overall diet. For example, it is feasible to incorporate the androgenic compounds in a grit or shell component of the diet or as a distinct entity in an inert carrier such as drinking water.

In practicing one form of the present invention, the androgenic compounds are incorporated in an all-mash or an all-pellet diet. Alternatively, the androgenic compounds are incorporated in various dietary combinations such as: mash, pellets and grain; mash and pellets; grain and pellets; or mash and grain. The androgens may be added to the diet ration as the pure, dry powder, as a stabilized concentrate wherein the powder is coated with a protective material such as gelatine or gelatine and sugar, as a adsorbate on silica gel, oat meal, soybean oil meal or as a simple mixture with a diluent, such as cereal meal, and oil meal and stabilizers such as butylated hydroxy toluene, butylated hydroxy anisole, tocopherol or the like, in solution in a vegetable oil, such as peanut oil, soybean oil, sesame oil and the like (preferably including one or more stabilizers such as those enumerated above). An oil solution lends itself to mixing with or spraying on the basal ration. In addition, an emulsion or dispersion in peanut oil, soybean oil, or the like may be made and these are particularly adapted for aqueous compositions used as drinking water.

Specifically, the following mash formulation incorporating from 0.1 to 20.0 milligrams of androgenic compounds per pound of diet, is particularly effective:

| | Parts by total weight |
|---|---|
| Vegetable proteins | 5–20 |
| Animal proteins | 0–20 |
| Minerals | 2–9 |
| Vitamin concentrates | 0–8 |
| Lipids | 0–10 |
| Cereals | 40–80 |

It has been found that less androgen than the stated minimum has little or no desired effect and that more androgen than the stated maximum causes molting and a decrease in egg production.

In the foregoing formulation, for example, vegetable proteins are soybean oil meal, cotton seed meal, and corn gluten meal; animal proteins are fish meat, meat and bone scrap, and dried milk; minerals are phosphorous providing compounds such as dicalcium phosphate, calcium providing compounds such as calcium carbonate, and ordinary salt; vitamin concentrates provide vitamins A, D, E, K, riboflavin, niacin, choline and pantothenic acid; lipids are fats such as tallow and lard and oils such as cotton-seed oil and soybean oil; and cereals are corn, oats, wheat, barley, middlings, bran and red dog flour. In addition, to the foregoing formulation are added unidentified factor carriers such as: alfalfa to supply the alfalfa factor; whey to supply the whey factor; meat scrap, fish meal or liver to supply the liver factor; corn distillers solubles; and streptomyces fermentation residue to supply the fermentation factor. In addition to the nutrient factors provided by the foregoing materials, other factors are provided by antibiotics, arsenicals and the like, which are of value directly or indirectly in preventing or treating diseases or in stimulating feed consumption. Preferably, the androgenic compound is incorporated into the feed first by premixing in an appropriate porportion with from ¼% to 2% of the final feed, and then uniformly distributing the premix throughout the final feed.

The following non-limiting examples further illustrate the present invention. Percent and parts are by weight unless otherwise indicated.

EXAMPLE 1

Four groups of sixteen White Leghorn hybrid hens starting at 14 months of age are fed for 84 days on the following feed composition:

| Component: | Lbs./cwt. |
|---|---|
| Soybean oil meal (50% protein) | 18.6 |
| Dehydrated alfalfa meal | 2.50 |
| Trace mineral mixture [1] | 0.50 |
| Calcium carbonate | 5.60 |
| Dicalcium phosphate | 3.00 |
| Vitamin concentrate [2] | 1.20 |
| Fat (tallow) | 2.00 |
| Methionine hydroxy analog | 0.05 |
| Ethoxyquin (an antioxidant) | 0.0125 |
| Yellow corn | 66.5375 |

[1] The trace minerals consist of:

| | Lbs./cwt. |
|---|---|
| Magnesium sulfate | 0.260 |
| Ferric citrate | 0.150 |
| Potassium iodide | 0.005 |
| Zinc chloride | 0.025 |
| Manganese oxide | 0.030 |
| Copper sulfate | 0.030 |
| Total | 0.500 |

[2] The vitamin supplements consists of:

| | Mg. |
|---|---|
| Vitamin A (3000 USP units/gm.) | 160,000 |
| Vitamin D$_3$ (3000 IC units/gm.) | 18,000 |
| Riboflavin | 312 |
| Niacin | 2,880 |
| d-Pantothenic acid | 1,008 |
| Choline chloride (87% choline) | 82,958 |
| Vitamin B$_{12}$ | 0.72 |
| Menadione sodium bisulfite | 43 |
| Thiamine | 192 |
| Pyridoxine | 312 |
| Folic acid | 60 |
| Biotin | 9.6 |
| Inert | 279,505 |
| Total (1.2 lb.) | 545,280 |

Group 2 received the same diet as Group 1, except that 2.3 milligrams of methyl testosterone are added per pound of feed. Groups 3 and 4 also received the same diet as Group 1 except that 9.1 milligrams and 19.2 milligrams, respectively, of methyl testosterone are added per pound of feed. All birds are weighed individually at the beginning and end of the experiment. During the fifth and eleventh week of the experiment eggs are collected from all birds on five consecutive days. The eggs are stored overnight at 1° C. On each morning following collection, the eggs are broken out of their shells individually and the albumen height measured with an Ames S-6428 micrometer and Haugh units calculated. Results are given in Table 1 below.

TABLE 1.—EFFECT OF METHYL TESTOSTERONE ON EGG QUALITY IN HENS

| Methyl testosterone mg./lb.: | Haugh units (index of albumen height) |
|---|---|
| 0 | 72.2 |
| 2.3 | 77.5 |
| 9.1 | 75.6 |
| 19.2 | 76.2 |

EXAMPLE 2

The procedure of Example 1 is repeated using 9α-fluoro 11-β-hydroxy 17α-methyl testosterone. Results are given in Table 2 below.

TABLE 2.—EFFECT OF 9α-FLUORO 11β-HYDROXY 17α-METHYL TESTOSTERONE ON EGG QUALITY IN HENS

| Androgenic material mg./lb.: | Haugh units (index of albumen height) |
|---|---|
| 0 | 71.7 |
| 0.5 | 76.2 |
| 2.5 | 78.5 |
| 12.5 | 78.8 |

In practicing the present invention, preferably feed incorporating the stated proportion of androgen is provided continuously over a predetermined period of life span measured in terms of weeks or months. However, it is to be understood that in the foregoing process broadly, the stated proportion of androgen should be considered in relation to an overall diet for the predetermined period of life span rather than merely for a specific dietary formulation. Thus, in general over a period of several weeks a typical individual fowl, consuming on the average from 0.1 to 0.3 pound of diet per day, should receive on the average from 0.01 to 6.0 milligrams of androgen per day. In other words it would be possible to vary the diet from day to day so as to incorporate at any given time a quantity of androgen falling outside of the stated range, although the average quantity of androgen measured over several days would fall within the stated range.

What is claimed is:

1. A method of improving egg quality in poultry which consists essentially of orally administering to laying hens a diet consisting essentially of a nutrient feed composition and as an essential ingredient an androgen, said androgen being present in the proportion of about 0.1 to 20 milligrams for each pound of said diet.

2. A method of improving egg quality in poultry which consists essentially of orally administering to laying hens a diet consisting essentially of a nutrient feed composition and as an essential ingredient a cyclopentenophenanthrene derivative having 17 nuclear carbon atoms, a substituent methyl group at position 10, a substituent methyl group at position 13, and a substituent at both positions 3 and 17 selected from the group consisting of keto-oxygen and hydroxyl, said derivative being present in the proportion of about 0.1 to 20 milligrams for each pound of diet.

3. A method of impriving egg quality in poultry which consists essentially of orally administering to laying hens a feed composition consisting essentially of a nutrient feed and an androgenic material selected from the group consisting of androsterone, testosterone and methyl testosterone.

4. A method of claim 1 wherein the androgen is androsterone.

5. A method of claim 1 wherein the androgen is testosterone.

6. A method of claim 1 wherein the androgen is methyl testosterone.

7. A method of claim 1 wherein the androgen is 9α-fluoro 11β-hydroxy 17α-methyl testosterone.

8. A method of improving egg quality in poultry which consists essentially of orally administering, continuously, to laying hens from 0.1 to 0.3 pound of feed composition per day per unit throughout a period of several weeks, said feed composition consisting essentially of about .1 to 20 milligrams of androgenic material per pound of said feed composition and nutrient factors.

References Cited

UNITED STATES PATENTS 2,945,765    7/1960    Snyder et al. _____ 99—4
3,148,112    9/1964    Zimbelman _____ 99—2 XR RAYMOND N. JONES, *Primary Examiner.*

HERMAN H. KLARE III, *Assistant Examiner.*

U.S. Cl. X.R.

424—243